United States Patent
Anurag

(10) Patent No.: US 9,069,954 B2
(45) Date of Patent: Jun. 30, 2015

(54) SECURITY THREAT DETECTION ASSOCIATED WITH SECURITY EVENTS AND AN ACTOR CATEGORY MODEL

(75) Inventor: Singla Anurag, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 39 days.

(21) Appl. No.: 13/699,030

(22) PCT Filed: May 20, 2011

(86) PCT No.: PCT/US2011/037318
§ 371 (c)(1),
(2), (4) Date: Nov. 20, 2012

(87) PCT Pub. No.: WO2011/149773
PCT Pub. Date: Dec. 1, 2011

(65) Prior Publication Data
US 2013/0081141 A1  Mar. 28, 2013

Related U.S. Application Data

(60) Provisional application No. 61/348,187, filed on May 25, 2010.

(51) Int. Cl.
*G06F 21/55* (2013.01)
*G06F 21/57* (2013.01)
*H04L 29/06* (2006.01)

(52) U.S. Cl.
CPC .............. *G06F 21/55* (2013.01); *G06F 21/577* (2013.01); *H04L 63/1425* (2013.01); *G06F 21/554* (2013.01)

(58) Field of Classification Search
None
See application file for complete search history.

(56) References Cited

U.S. PATENT DOCUMENTS

| | | | |
|---|---|---|---|
| 7,114,183 B1 * | 9/2006 | Joiner | 726/23 |
| 7,376,969 B1 | 5/2008 | Njemanze et al. | |
| 7,509,677 B2 | 3/2009 | Saurabh et al. | |
| 2002/0163926 A1 | 11/2002 | Moharram | |
| 2003/0122667 A1 | 7/2003 | Flynn | |
| 2005/0222820 A1 | 10/2005 | Chung | |
| 2008/0104046 A1 * | 5/2008 | Singla et al. | 707/4 |
| 2008/0162592 A1 | 7/2008 | Huang et al. | |
| 2008/0307525 A1 * | 12/2008 | Nickle | 726/22 |
| 2009/0064333 A1 | 3/2009 | Sauraph et al. | |
| 2009/0178111 A1 * | 7/2009 | Moriconi et al. | 726/1 |

(Continued)

FOREIGN PATENT DOCUMENTS

| | | |
|---|---|---|
| KR | 10-2008-0030130 | 4/2008 |
| WO | WO-2008151321 | 12/2008 |

OTHER PUBLICATIONS

European Patent Office, Extended EP Search Report, Corresponding EP Appl No. 11787160.8, 6pp, Sep. 4, 2014.

(Continued)

*Primary Examiner* — Jung Kim
*Assistant Examiner* — Janusz Kusyk
(74) *Attorney, Agent, or Firm* — Mannava & Kang, P.C.

(57) ABSTRACT

Security events associated with network devices and an actor category model are stored (501, 503). The actor category model includes levels arranged in a hierarchy and each level is associated with a subcategory for a category of the model. Security events are correlated with the actor category model (505), and a determination of whether a security threat exists is performed based on the correlating (506).

17 Claims, 4 Drawing Sheets

(56) References Cited

U.S. PATENT DOCUMENTS

| | | |
|---|---|---|
| 2010/0011031 A1 | 1/2010 | Huang et al. |
| 2010/0306285 A1 | 12/2010 | Shah et al. |
| 2011/0066585 A1 | 3/2011 | Subrahmanyam et al. |
| 2011/0083190 A1* | 4/2011 | Brown et al. ................ 726/26 |

OTHER PUBLICATIONS

Sandhu et al. "The NIST Model for Role-Based Access Control: Towards a Unified Standard", Proceedings of the 5th. ACM Workshop on Role-Based Access Control. Berlin, Germany, Jul. 26-27, 2000; [ACM Role-Based Access Control Workshop], New York, NY:ACM, US, Jul. 26, 2000, pp. 47-63.

* cited by examiner

SECURITY THREAT DETECTION ASSOCIATED WITH SECURITY EVENTS AND AN ACTOR CATEGORY MODEL

PRIORITY

The present application claims priority to U.S. Provisional Patent Application Ser. No. 61/348,187, filed May 25, 2010, which is incorporated by reference in its entirety.

BACKGROUND

The field of security information/event management is generally concerned with collecting data from networks and network devices that reflects network activity and/or operation of the devices, and analyzing the data to enhance security. For example, the data can be analyzed to identify an attack on the network or a network device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a network device. Examples of network devices include firewalls, intrusion detection systems, servers, etc.

A security system is useful if it can discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. However, discriminating between normal system usage and true intrusions is difficult, especially in large networks that may generate hundreds of thousands of messages or log file entries.

In addition, the ability to detect intrusions is exasperated, in many instances, because a single user may have multiple IDs for different systems (e.g., email ID, badge ID, Windows domain ID, UNIX account IDs on various machines, application IDs, etc.) monitored by the security system. It is difficult to correlate activities by the same user from different IDs. Similarly, it is difficult to consider roles and location to detect suspicious activity. For example, certain activity may be allowed only for California employees or employees that directly or indirectly inherit a certain role.

BRIEF DESCRIPTION OF DRAWINGS

The embodiments are described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent that the embodiments may be practiced without limitation to all the specific details. Also, the embodiments may be used together in various combinations.

According to an embodiment, a security information and event management system (SIEM) collects event data from sources including network devices and applications, and analyzes the data to identify network security threats. Analyzing may be performed using hierarchal actor category models that organize user data according to predetermined categories. For example, the models organize user data by location, by organization or reporting structure, by roles or other criteria. The models may include multiple levels in a hierarchy and different rules for determining security threats may be applicable to different levels. Parent-child relationships can exist between the levels and may be used to inherent rules among the levels.

The SIEM may also store other information to correlate security events with users to identify threats. The information may include multiple account IDs associated with each user. The information may also include user account ID history and user account ID authenticator information.

Figure 1:
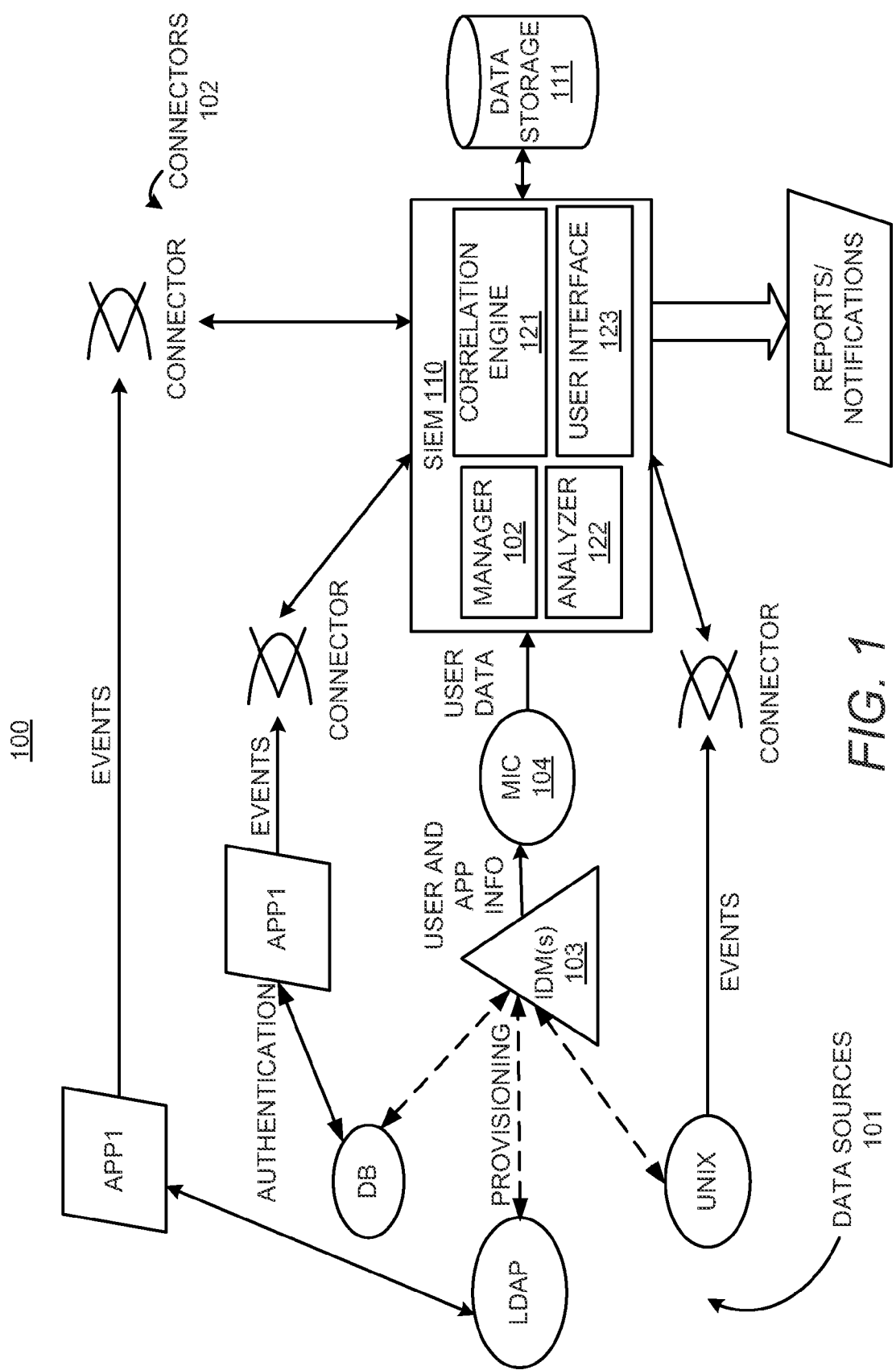
FIG. 1 illustrates a system, according to an embodiment.

FIG. 1 illustrates an environment 100 including an SIEM 110, according to an embodiment. The environment 100 includes data sources 101 generating event data for security events, which is collected by the SIEM 110 and stored in the data storage 111. The data storage 111 may include memory and/or non-volatile storage and may include a database or other type of data storage system. The data storage 111 stores any data used by the SIEM 110 to correlate and analyze event data to identify security threats. A security event, also referred to as an event, is any activity that can be analyzed to determine if it is associated with a security threat. The activity may be associated with a user, also referred to as an actor, to identify the security threat and the cause of the security threat. Activities may include logins, logouts, sending data over a network, sending emails, accessing applications, reading or writing data, etc. A security threat includes activity determined to be indicative of suspicious or inappropriate behavior, which may be performed over a network or on systems connected to a network. Common security threats, by way of example, are user attempts to gain unauthorized access to confidential information, such as social security numbers, credit card numbers, etc., over a network.

The data sources 101 may include network devices, applications or other types of data sources described below operable to provide event data that may be used to identify network security threats. Event data is data describing security events. Event data may be captured in logs or messages generated by the data sources 101. For example, intrusion detection systems (IDSs), intrusion prevention systems (IPSs), vulnerability assessment tools, firewalls, anti-virus tools, anti-spam tools, and encryption tools may generate logs describing activities performed by the source. Event data may be provided, for example, by entries in a log file or a syslog server, alerts, alarms, network packets, emails, or notification pages.

Event data can include information about the device or application that generated the event and when the event was received from the event source ("receipt time"). The receipt time may be a date/time stamp, and the event source is a network endpoint identifier (e.g., an IP address or Media Access Control (MAC) address) and/or a description of the source, possibly including information about the product's vendor and version. The data/time stamp, source information and other information is used to correlate events with a user and analyze events for security threats.

Event data may be organized in a data structure that includes one or more fields, where each field can contain a value. Event data may be provided in any format. The SIEM 110 may normalize event data into a structured format or schema. This normalization may include mapping event data to the appropriate fields in the structured representation of the event. The mapping operation uses knowledge about the format of an event and may be specified at the time of development.

Examples of the data sources 101 are shown in FIG. 1 as Lightweight Directory Access Protocol (LDAP), Database (DB), UNIX, App1 and App2. LDAP, DB and UNIX are systems that include network devices, such as servers, and may generate event data. App1 and App2 are applications that are hosted for example by the LDAP and DB systems respectively, and also generate event data. Event data collected by the SIEM 110 is shown as "Events" in FIG. 1.

Other examples of data sources 101 may include security detection and proxy systems, access and policy controls, core service logs and log consolidators, network hardware, encryption devices, and physical security. Examples of security detection and proxy systems include IDSs, IPSs, multi-purpose security appliances, vulnerability assessment and management, anti-virus, honeypots, threat response technology, and network monitoring. Examples of access and policy control systems include access and identity management, virtual private networks (VPNs), caching engines, firewalls, and security policy management. Examples of core service logs and log consolidators include operating system logs, database audit logs, application logs, log consolidators, web server logs, and management consoles. Examples of network devices includes routers and switches. Examples of encryption devices include data security and integrity. Examples of physical security systems include card-key readers, biometrics, burglar alarms, and fire alarms.

Connectors 102 may include machine readable instructions that provide event data from the data sources 101 to the SIEM 110. The connectors 102 may provide efficient, real-time (or near real-time) local event data capture and filtering from the data sources 101. The connectors 102, for example, collect event data from event logs or messages and can operate at the network device, at consolidation points within the network, and/or through simple network management protocol (SNMP) traps. The connectors 102 send the event data to the SIEM 110. The collectors 102 may be configurable through both manual and automated processes and via associated configuration files. Each connector may include one or more software modules including a normalizing component, a time correction component, an aggregation component, a batching component, a resolver component, a transport component, and/or additional components. These components may be activated and/or deactivated through appropriate commands in the configuration file.

Identity management systems (IDMS) 103 provision user accounts to user repositories and systems, as shown in FIG. 1. Examples of the IDMS 103 may include Microsoft's® Active Directory, Sun's® Identity Manager, and Oracle's® Identity Manager. The IDMs 103 track the accounts on the systems, such as the DB, LDAP and UNIX systems. The provisioning, including tracking of user accounts, is represented by the dashed lines in FIG. 1. Also, each of the systems may have its own authentication system for authenticating users. For example, the LDAP and DB systems authenticate users creating accounts and logging into App1 and App2.

A model import connector (MIC) 104 translates external data to resource/data models within ESM. The MIC 104 derives user and user-to-application mapping information from the ICBMs 103 and then writes that as user information in a user data model in the SIEM 110. Each user is represented as a single, unique user identity in the SIEM 110. Connectors 102 send event data to the SIEM 110, which is associated with the unique user IDs, thus allowing the desired level of reporting security threats.

The SIEM 110 may store data for users in a user data model having predetermined fields. The mapping performed by the MIC 104 may include matching fields from the data models used by the IDMs 103 with the data model of the SIEM 110 so the user account data from the IDMs 103 is stored in the proper fields in the SIEM 110 data model.

If the fields in the SIEM 110 user data model are also included in an IDM data model, the MIC 104 synchronizes the data models. If the data models are different, the MIC 104 may enable displaying the fields to a user, and the user selects the mapping between the fields. Examples of fields may include UUID (unique user ID), first name, last name, address, telephone, etc. After mapping is completed, the user account information from the IDMS 103 is populated in the SIEM 110 data model.

The SIEM 110 analyzes event data to identify security threats. Analysis can include detection, correlation, and notification or escalation. The analysis may include forensic analysis. The SIEM 110 correlates past events with user attributes based on the state of the user at the time the event occurred. For example, if the user did not have the role of FINANCE_DBA in the past and accessed information from financial databases at that time, then rules and reports flag this as a violation. This happens even if the user has now transitioned to the FINANCE_DBA group/role. History of a user account is stored, which may include a time period a particular user held the account. This history may be used for forensic analysis. The analysis may also include correlating events from connectors with user attributes that pertain to the time of occurrence of the event as opposed to correlating them with the current state of the user.

The SIEM 110 includes a manager 120 receiving and storing user account data and event data in the data storage 111. A correlation engine 121 correlates event data with users to associate activities described in event data from data sources 101 with particular users. For example, from a user-defined set of base event fields and event end time, a mapping is done to attribute the event to a user. For example, event data may include an account ID and application event fields and these fields are used to look up user information in the data storage 111 to identify a user having those attributes at the time the event occurred.

Examples of single value attributes that are used to describe a user and perform lookups by the correlation engine 121 include UUID, first name, middle initial, last name, full name, IDM identifier, domain name, employee type, status, title, company, organization, department, manager, assistant, email address, location, office, phone, fax, address, city, state, zip code, country, etc. In addition to single valued attributes, actors may also have multi-valued attributes to hold account and role information. Account ID is an example of a multi-value attribute. For example, enterprise users most likely have multiple accounts on multiple applications (e.g., a network login-id, an email address, and a web application account-id).

The IDMs 103 can provision user accounts to various repositories and systems. Thus, it is difficult to determine mappings between provisioned systems (e.g., authenticators) and applications (e.g., App1 and App2) that send events to the SIEM 110. Accordingly, the SIEM 110 maintains a table in the data storage 111 that maps applications and authenticators, and this information may be used to correlate events with users. Table 1 is an example of the application-authenticator mapping.

TABLE 1

Application-Authenticator Mapping

| Device Vendor | Device Product | Agent Address | Agent Zone Resource | Authenticator |
|---|---|---|---|---|
| Oracle | App1 | 192.168.0.1 | RFC1918: 192.168.0.0.-192.168.255.255 | DB |
| Sun | App2 | 192.168.0.2 | RFC1918: 192.168.0.0-192.168.255.255 | LDAP |
| IBM | Unix | 192.168.0.3 | RFC1918: 192.168.0.0-192.168.255.255 | Unix |

The Device Vendor, Device Product, Agent Address, and Agent Zone Resource columns are populated with values that are observed from the events. Each combination of these columns identifies an application which, in turn, should map to an Authenticator defined in the source IDM.

As indicated above, account IDs are also stored as part of a user's attributes in the data storage 111. A user can have multiple accounts. These accounts are best described by authenticator name and the corresponding account-id, which are multi-valued attributes. For example, the actor John Smith can have the application account attributes. Table 2 shows an example of account IDs stored for John Smith which may be used for correlating events with John Smith.

TABLE 2

Authenticator Account ID Mapping for John Smith

| Authenticator | Account ID |
|---|---|
| DB | Jsmith |
| LDAP | john.smith |
| UNIX | Josmith |

Correlation may include the manager 120 storing event data in the data storage 111. The correlation engine 121 identifies events by their application name (e.g., through the "Device Vendor", "Device Product", "Agent Address", and "Agent Zone Resource" event fields) and the account ID (e.g., "IMO" event field). The application name is then used to derive the authenticator from the application-authenticator" table. The user associated with the event is derived by doing a lookup based on the authenticator and account ID. If the authenticator cannot be derived, then lookups based on just the account ID or other fields may be performed.

A user can have multiple roles. To track role assignment and activity, role information is stored as part of an actor's attributes. Since a single user can have multiple roles, these roles are best described by the role name, role type, and resource name where the user has the role. For example, the user John Smith can have multiple roles. Table 3 shows an example of roles stored for John Smith which may be used for correlating events with John Smith.

TABLE 3

Role Mapping for John Smith

| Role Name | Resource Name | Role Type |
|---|---|---|
| Administrator | Active Directory | IT |
| User | Perforce | IT |
| Approver | Oracle ERP | Business |

The SIEM 110 maintain reports regarding the status of security threats and their resolution. The SIEM 110 provides notifications and reports through a user interface 123 or by sending the information to users or other systems.

An analyzer 122 in the SIEM 110 uses rules to evaluate each event with network model and vulnerability information to develop real-time threat summaries. The analyzer 122 may include a rules engine to correlate event data with security rules in order to identify security threats. This may include identifying multiple individual events that collectively satisfy one or more rule conditions such that an action is triggered. The aggregated events may be from different data sources and are collectively indicative of a common incident representing a security threat as defined by one or more rules. The actions triggered by the rules may include notifications transmitted to designated destinations (e.g., security analysts may be notified via consoles e-mail messages, a call to a telephone, cellular telephone, voicemail box and/or pager number or address, or by way of a message to another communication device and/or address such as a facsimile machine, etc.) and/or instructions to network devices to take action to thwart a suspected attack (e.g., by reconfiguring one or more of the network devices, and or modifying or updating access lists, etc.). The information sent with the notification can be configured to include the most relevant data based on the event that occurred and the requirements of the analyst. In some embodiments, unacknowledged notifications result in automatic retransmission of the notification to another designated operator. Also, a knowledge base may be accessed to gather information regarding similar attack profiles and/or to take action in accordance with specified procedures. The knowledge base contains reference documents (e.g., in the form of web pages and/or downloadable documents) that provide a description of the threat, recommended solutions, reference information, company procedures and/or links to additional resources. Indeed, any information can be provided through the knowledge base. By way of example, these pages/documents can have as their source: user-authored articles, third-party articles, and/or security vendors' reference material.

As part of the process of identifying security threats, the analyzer 122 examines received events to determine which (if any) of the various rules being processed in the SIEM 110 may be implicated by a particular event or events. A rule is considered to be implicated if an event under test has one or more attributes that satisfy, or potentially could satisfy, one or more rules. For example, a rule can be considered implicated if the event under test has a particular source address from a particular subnet that meets conditions of the rule. Events may remain of interest in this sense only for designated time intervals associated with the rules and so by knowing these time windows the analyzer 122 can store and discard events as warranted. Any interesting events may be grouped together and subjected to further processing by the analyzer 122.

The analyzer 122 may use hierarchal actor category models that organize user data according to predetermined categories to identify security threats. Examples of the predetermined categories include location, internal organization hierarchy, and roles. The models may include multiple levels in a hierarchy and different rules for determining network security threats may be applicable to different levels. Parent-child relationships can exist between the levels and may be used to inherent rules among the levels. The relationships between levels and between nodes in different levels may be bidirectional or unidirectional. The models, including their relationships and corresponding rules, are stored in the data storage 121.

Figure 2:
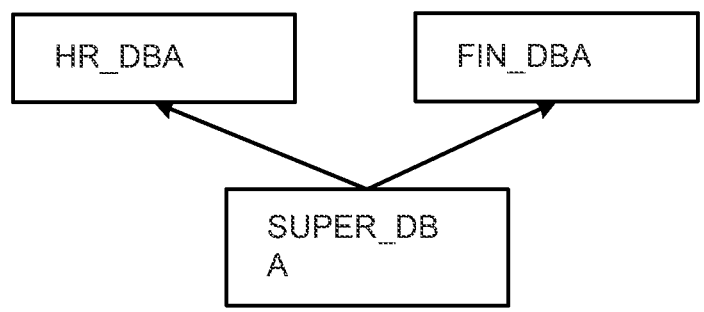
FIGS. 2-4 illustrate examples of actor category models, according to an embodiment.
Figure 3:
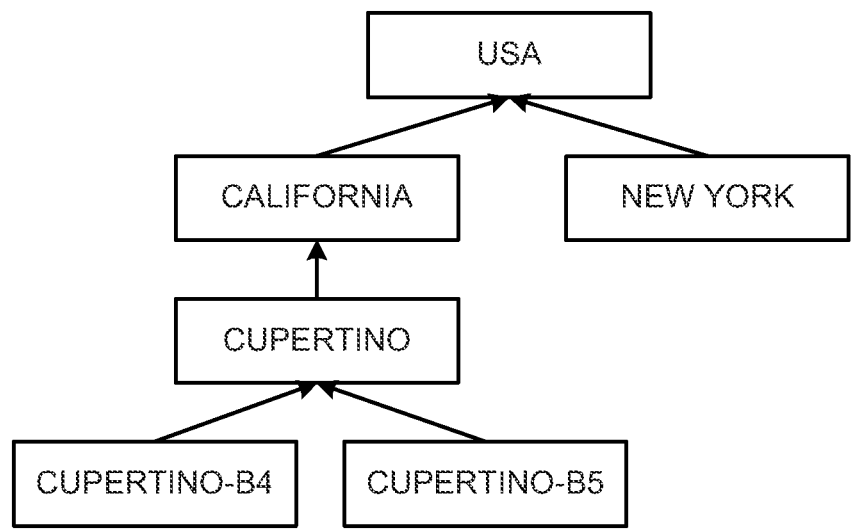
Figure 4:
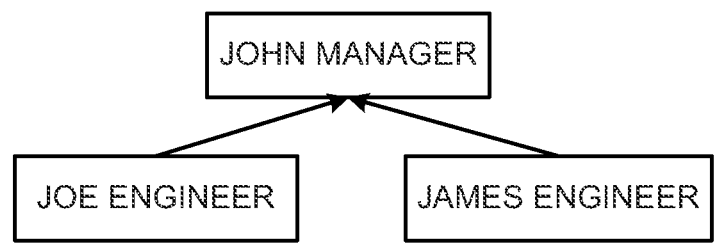

FIGS. 2-4 show examples of hierarchal models. The examples shown in FIG. 4 are simplistic. Hierarchal models generated, stored and used by the SIEM 110 may be more complex and may have many more levels and nodes. FIG. 2 shows a roles hierarchal model. A role may describe the responsibilities or duties of a user in an organization. The roles shown in FIG. 2 include HR_DBA, FIN_DBA and SUPER_DBA. HR_DBA is the role of a database administrator (DBA) with access to databases in a human resources (HR) department. FIN_DBA is the role of a DBA with access to databases in a finance department, and SUPER_DBA is the role of a DBA with access to databases companywide.

The hierarchy of the roles is shown in FIG. 2. In this case, the role of SUPER_DBA supersedes the roles of HR_DBA and FIN_DBA. Therefore, if some operations are permissible for a user with role HR_DBA, the operations may be presumed permissible for role of SUPER_DBA because SUPER_DBA is the parent of HR_DBA and FIN_DBA. In this way, SUPER_DBA is inheriting the permissions and rules of HR_DBA and FIN_DBA.

FIG. 3 shows a hierarchal location model. Modeling the hierarchy of locations is useful in defining location level policies. For example, accessing some services or performing certain activities may be permissible for employees in one state or country only. Employees typically have their exact location assigned (for example, Location: Cupertino-B4) by the organization, and this information is used to build the hierarchal location model. The hierarchal location model includes the following locations: USA: Country, California: State, New York: State, Cupertino: City, Cupertino-B4: An office building in Cupertino, and Cupertino-B5: another office building in Cupertino. The hierarchy of these locations is shown in FIG. 4 and may be used to determine authorized activities. For example, if an activity is permissible for California employees, then it is also permissible for employees in Cupertino-B4 and B5.

FIG. 4 shows a hierarchal organization model. This model may mimic the organization chart or reporting structure of an organization. Maintaining employee reporting structure in the SIEM 110 can be useful for various reasons, in addition to display of this information. For example, it can be used to check who is entitled to information about whom. For example, consider following reporting structure that Joe Engineer and James Engineer report to John Manager. This structure is shown in FIG. 4. John Manager may have the permissions to view records of Joe Engineer and James Engineer but Joe Engineer and James Engineer may only have permissions to view their own records.

The categories for the models shown in FIGS. 2-4 are examples of various categories that may be used. The SIEM 110 enables users to build models for any category, and enables users to specify relationships, such as parent-child relationships, where permissions and polices are inherited. The policies may be described by rules associated with different levels for determining whether a security threat exists. For example, each hierarchal model may include fields comprised of one or more of model ID, node ID, level ID resource field, child field and parent field. The resource field includes a description of the model. The child field and the parent field are used to identify whether a node is a child and what is the parent. These fields may be used to determine whether a node is a descendant or child of another node.

Figure 5:
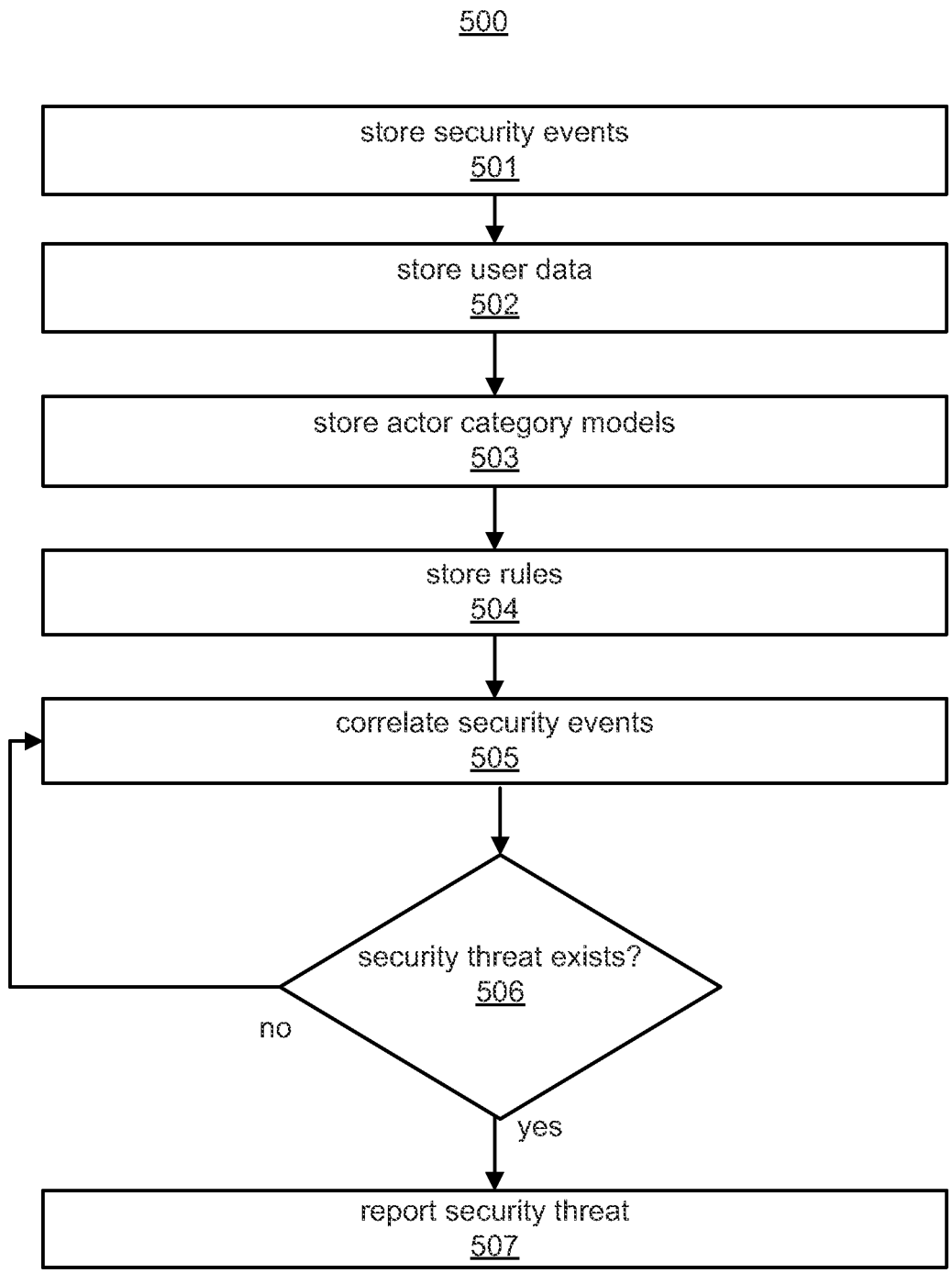
FIG. 5 illustrates a method for security threat detection, according to an embodiment.

FIG. 5 illustrates a method 500 for detecting security threats based on captured security events, according to an embodiment. The method 500 is described with respect to the SIEM 110 shown in FIG. 1 by way of example and not limitation. The method 500 may be practiced in other systems. Also, one or more of the blocks in the method 500 may be performed in a different order than shown or substantially simultaneously.

At 501, the SIEM 110 stores security events associated with network devices. For example, the correlators 102 send event data captured for the data sources 101 to the SIEM 110. The SIEM 110 stores event data in the data storage 111. The event data may be stored in an event data model comprised of predetermined fields. The predetermined fields may include device ID, date/time stamp, account ID, etc. Security events may continuously or periodically be stored as the SIEM 110 receives them.

At 502, the SIEM 110 stores user data for the users of the data sources 101. The user data is stored in the data storage 111. The SIEM 110 may use a user data model to store user data. The MIC 103 may map user information from the IDMs 103 to the user data model for the SIEM 110 to organize the user data into predetermined fields. The user data model may include a UUID for each user and user account IDs for each user as well as other user information. Stored user data and the models and other data described herein may be updated over time and new data may be stored as received.

At 503, the SIEM 110 stores actor category models. The actor category models are stored in the data storage 111. The actor category modes may include hierarchal models including a plurality of levels arranged in a hierarchy and each level is associated with a subcategory for a category of the model. Examples of the actor category models are shown in FIGS. 2-4 and comprise models for the categories of location, role and reporting structure. Subcategories may be associated with the levels. For example, subcategories for location may include country, state and city, and each subcategory may be associated with a particular level. The actor category models may include descendant information that identifies whether a node is a direct or indirect descendant of a node in another level.

At 504, the SIEM 110 stores rules for determining whether a security threat exists. The rules may be created by users of the SIEM 110. The rules may specify one or more conditions and one or more actions that are triggered if the conditions are satisfied. With regard to the actor category models, rules may be stored for levels to implement policies for the levels. The rules may also specify whether a descendant inherits the rules of its parent, grandparent, etc.

The storing described in 501-504 may include storing in memory and/or storing in non-volatile data storage, such as a database on a server. For example, for in-memory storage, event data is stored in memory and correlation and/or analysis described at 505 and 506 below is performed in-memory for faster processing. In-memory provides real-time or close to real-time correlation and processing for identifying security threats. The output of correlation and analysis may be stored in the database. Event data may also be stored in a database and correlation and analysis can be performed by accessing the data from the database. In one example, the database is used for forensic, historical analysis of event data.

At 505, the SIEM 110 correlates security events with a stored actor category model. For example, attributes associated with a security event and a user associated with the event are compared with attributes in actor category models. If values for the attributes match, the security events are correlated with the matching category model. As an example, a security event may be access to an HR record by a user. The user is determined to have a role of manager according to its attributes. Because the user has a role value (e.g., manager), the role actor category model is associated with the user, and the model is accessed to determine whether there are any levels or nodes for manager. Other actor category models may also be accessed for correlation.

At 506, the SIEM 110 determines whether a security threat exists based on the correlating. For example, the level in the role actor category model for manager is identified. Rules associated with the level are identified. The SIEM 110 determines if conditions for the rules are satisfied, which may be representative of a security threat.

At 507, if a security threat exists an action is performed, such as generating reports and/or notifications alerting to the security threat. The action may be specified in the identified rules.

Correlation and the detection of the security threat may be performed using session lists and active lists. A session list may be created for received security events and stores event data for a period of time. For example, a rule has a condition that a user associated with a badge ID swipe in a server room must also be associated with a server login in the server room within 2 minutes of the badge swipe. The session list tracks the events in the 2-minute time period. An active list may be created that maps the UUID of each user in the user data model for the SIEM 110 to user IDs for each user identified for example by the IDMs 103. The active list aggregates at the user level rather than the machine level by associating a user with all its account IDs and other information.

Figure 6:
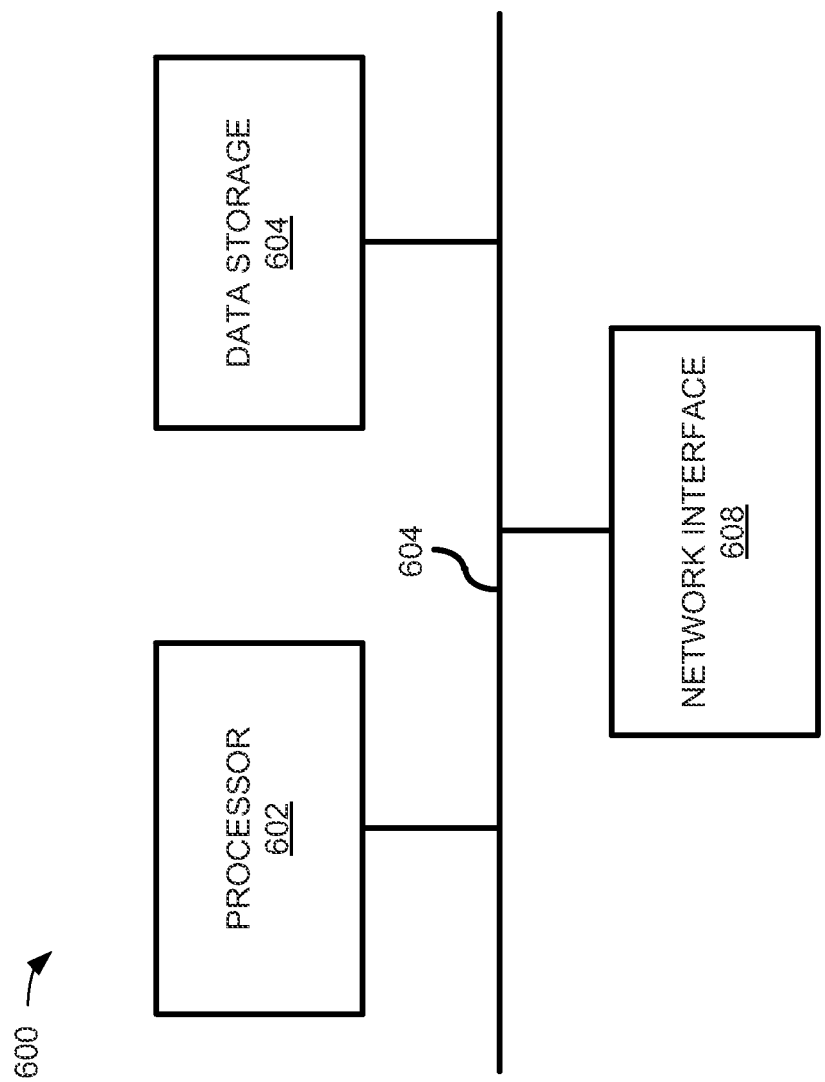
FIG. 6 illustrates a computer system that may be used for the methods and system, according to an embodiment.

FIG. 6 shows a computer system 600 that may be used with the embodiments described herein. The computer system 600 represents a generic platform that includes components that may be in a server or another computer system or in components of a computer system. The computer system 600 may be used as a platform for the SIEM 110 shown in FIG. 1. The computer system 600 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 includes a processor 602 or other hardware processing circuit that may implement or execute machine readable instructions performing some or all of the methods, functions and other processes described herein. Commands and data from the processor 602 are communicated over a communication bus 606. The computer system 600 also includes data storage 604, such as random access memory (RAM) or another type of data storage, where the machine readable instructions and data for the processor 602 may reside during runtime. Network interface 608 sends and receives data from a network. The computer system 600 may include other components not shown.

While the embodiments have been described with reference to examples, various modifications to the described embodiments may be made without departing from the scope of the claimed embodiments.

What is claimed is:

1. A method of determining a security threat comprising:
storing security events associated with network devices;
storing an actor category model including a plurality of levels arranged in a hierarchy, wherein each level is associated with a subcategory for a category of the actor category model, wherein the actor category model comprises an attribute for users, and the actor category model comprises parent-child relationships between the plurality of levels, and child levels inherit rules from their parent levels;
correlating security events with the actor category model, wherein the correlating of the security events with the actor category model includes
identifying a user for each security event;
determining the actor category model is applicable to the user for each security event and any of the security events associated with the user by matching the attribute for users in the actor category model with a user attribute of the user in a user data model; and
identifying a level in the actor category model associated with the user for each security event; and
determining, by at least one processor, whether the security threat exists based on the correlating,
wherein the determining of whether the security threat exists based on the correlating includes
determining a security rule for the identified level; and
determining whether the security threat exists by applying the security rule.

2. The method of claim 1, comprising:
aggregating two or more of the security events into an aggregated event based on the correlating, wherein the aggregated event satisfies a condition in the identified rule.

3. The method of claim 1, further comprising:
modifying an attribute or a parent-child relationship in the actor category model; and
storing the modified actor category model.

4. The method of claim 1, further comprising:
providing a notification responsive to a determination that the network security threat exists.

5. The method of claim 1, comprising:
storing the user data model including an individual unique user identifier (ID) and an account for the user for each security event;
storing history in the user data model indicating a time period the user account is associated with the unique user ID; and
associating the user with a security event of the security events based on the history.

6. The method of claim 1, comprising:
storing a plurality of actor category models;
for each actor category model, determining whether the actor category model is associated with the security events based on attributes associated with the security events and the actor category model; and
for each actor category model determined to be associated with the security events, using the associated actor category model to identify rules to determine whether the security threat exists.

7. The method of claim 1, wherein identifying a user for each security event comprises:
determining an application associated with the security event;
identifying an authenticator that provisions user accounts for the application;

determine an account ID associated with the security event; and determining the actor based on the authenticator and the account ID.

8. A threat detection system comprising:
a non-transitory data storage that stores security events associated with network devices, and an actor category model including a plurality of levels arranged in a hierarchy and each level is associated with a subcategory for a category of the actor category model, wherein the actor category model comprises an attribute for users, and the actor category model comprises parent-child relationships between the plurality of levels, and child levels inherit rules from their parent levels; and
at least one physical processor that correlates security events with the actor category model, wherein to correlate the security events the at least one processor:
identifies a user for each security event;
determines the actor category model is applicable to the user for each security event and any of the security events associated with the user by matching the attribute for users in the actor category model with a user attribute of the user in a user data model;
identifies a level in the actor category model associated with the user for each security event; and
determines whether a security threat exists based on the correlating, wherein to determine whether the security threat exists, the at least one processor:
determines a security rule for the identified level; and
applies the security rule to determine whether the security threat exists.

9. The threat detection system of claim 8, wherein the non-transitory data storage stores the user data model including an individual unique user ID and an account for the user for each security event, stores history in the user data model indicating a time period each user account is associated with the unique user ID, and associates the user with a security event of the security events based on the history.

10. The threat detection system of claim 8, wherein to identify a user, for each security event, the physical processor determines an application associated with the security event, identifies an authenticator that provisions user accounts for the application, determines an account ID associated with the security event and determines the user based on the authenticator and the account ID.

11. The threat detection system of claim 8, wherein the physical processor aggregates two or more of the security events into an aggregated event based on the correlated security events, wherein the aggregated event satisfies a condition in the security rule.

12. The threat detection system of claim 8, wherein the physical processor modifies the attribute or a parent-child relationship in the actor category model; and stores the modified actor category model in the non-transitory data storage.

13. The threat detection system of claim 8, wherein the physical processor provides notification responsive to a determination being made that the network security threat exists.

14. The threat detection system of claim 8, wherein the non-transitory data storage stores a plurality of actor category models; and
for each actor category model, the at least one physical processor determines whether the actor category model is associated with the security events based on attributes associated with the security events and the actor category model; and for each actor category model determined to be associated with the security events, uses the associated actor category model to identify rules to determine whether the security threat exists.

15. The A non-transitory computer readable medium storing machine readable instructions that when executed by a physical processor cause the physical processor to:
store security events associated with network devices;
store an actor category model including a plurality of levels arranged in a hierarchy and each level is associated with a subcategory for a category of the model;
correlate security events with the actor category model, wherein to correlate the security events the at least one processor is to identify a user for each security event, determine the actor category model is applicable to the user for each security event and any of the security events associated with the user by matching the attribute for users in the actor category model with a user attribute of the user in a user data model, and identify a level in the actor category model associated with the user for each security event, wherein to identify the user for each security event, the processor determines an application associated with the security event, identifies an authenticator that provisions user accounts for the application, determines an account ID associated with the security event, and determines the user based on the authenticator and the account ID; and
determines whether the security threat exists based on the correlating, wherein to determine whether the security threat exists, the at least one processor is to select a security rule for the identified level from a plurality of security rules, and determine whether the security threat exists by applying the selected security rule.

16. The non-transitory computer readable medium of claim 15, wherein the machine readable instructions, when executed by the physical processor causes the physical processor to:
aggregate two or more of the security events into an aggregated event based on the correlated security events, wherein the aggregated event satisfies a condition in the security rule.

17. The non-transitory computer readable medium of claim 15, wherein the machine readable instructions, when executed by the processor cause the processor to:
modify an attribute or a parent-child relationship in the actor category model; and store the modified actor category model in a data storage.

* * * * *

UNITED STATES PATENT AND TRADEMARK OFFICE
CERTIFICATE OF CORRECTION

PATENT NO. : 9,069,954 B2  
APPLICATION NO. : 13/699030  
DATED : June 30, 2015  
INVENTOR(S) : Singla Anurag Page 1 of 1

It is certified that error appears in the above-identified patent and that said Letters Patent is hereby corrected as shown below:

Specification

In column 3, line 8, delete "App2," and insert -- App2. --, therefor.

In column 3, line 51, delete "IDMS" and insert -- IDMs --, therefor.

In column 3, line 53, delete "IDMS" and insert -- IDMs --, therefor.

In column 3, line 65, delete "ICBMs" and insert -- IDMs --, therefor.

In column 4, line 17, delete "IDMS" and insert -- IDMs --, therefor.

In column 5, line 53, delete "IMO" and insert -- UUID --, therefor.

Claims

In column 11, line 44, in Claim 10, delete "event" and insert -- event, --, therefor.

Signed and Sealed this  
Twelfth Day of April, 2016

Michelle K. Lee  
*Director of the United States Patent and Trademark Office*